United States Patent [19]
Persson et al.

[11] Patent Number: 5,408,921
[45] Date of Patent: Apr. 25, 1995

[54] APPARATUS FOR GAS TREATMENT OF PRODUCTS

[75] Inventors: Per-Oskar Persson, Helsingborg, Sweden; John R. Strong, Kirkland, Wash.; Ulf Wittander, Furulund, Sweden

[73] Assignee: Frigoscandia Equipment Aktiebolag, Helsingborg, Sweden

[21] Appl. No.: 997,944

[22] Filed: Dec. 31, 1992

[51] Int. Cl.⁶ .................................................. A23L 1/01
[52] U.S. Cl. ..................................... 99/443 C; 99/476; 126/21 A; 219/388
[58] Field of Search ............ 99/386, 443 C, 474–477; 126/21 A; 219/388, 400

[56] References Cited

U.S. PATENT DOCUMENTS

| | | | |
|---|---|---|---|
| 1,536,538 | 5/1925 | Stouffer | 99/386 |
| 1,656,709 | 1/1928 | Kelly | 99/386 |
| 1,817,875 | 8/1931 | Broadbent | 99/476 |
| 3,908,533 | 9/1975 | Fagerstrom | 99/443 C |
| 3,991,737 | 11/1976 | Del Fabbro | 126/21 A |
| 4,368,664 | 1/1983 | Smith | 99/443 C |
| 4,478,141 | 10/1984 | Svensson | 99/474 |
| 4,576,090 | 3/1986 | Burtea | 99/443 C |
| 4,779,524 | 10/1988 | Wade | 99/476 |
| 4,831,238 | 5/1989 | Smith | 219/388 |
| 4,873,107 | 10/1989 | Archer | 99/477 |
| 4,909,430 | 3/1990 | Yokota | 219/388 |
| 4,951,648 | 8/1990 | Shukla | 99/443 C |
| 4,986,174 | 1/1991 | Gongwer | 99/386 |
| 5,231,920 | 8/1993 | Alden | 99/475 |

FOREIGN PATENT DOCUMENTS 11107  4/1970  Japan .................. 99/386

Primary Examiner—David A. Scherbel
Assistant Examiner—Terrence R. Till
Attorney, Agent, or Firm—Browdy and Neimark

[57] ABSTRACT

An apparatus for gas treatment of products, especially food products, comprises a housing having an inlet opening and an outlet opening. A conveyor belt transports the products through the housing along a path from the inlet opening to the outlet opening. A tunnel encloses the conveyor belt at least along a part of the path from the inlet opening to the outlet opening, and has a perforated top wall. Gas suction means communicates with the tunnel for creating a vacuum in the interior of the tunnel. Gas conditioning means conditions the gas circulated by the gas suction means from the interior of the tunnel to the exterior thereof and back to the interior of the tunnel through the perforated top wall thereof. In this manner, gas sucked through the perforated top wall of the tunnel from the exterior thereof forms gas jets impinging upon the conveyor belt.

12 Claims, 5 Drawing Sheets

FIG._1
PRIOR ART
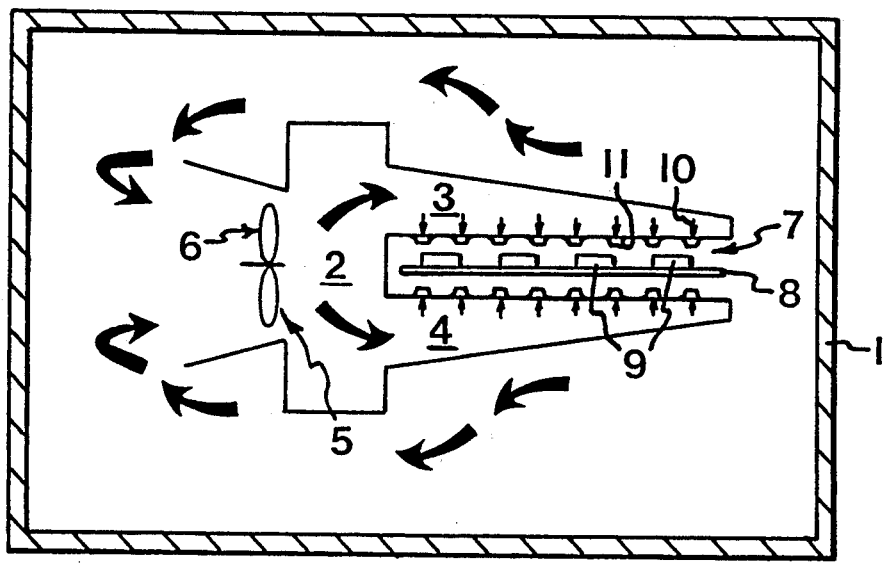
FIG._2
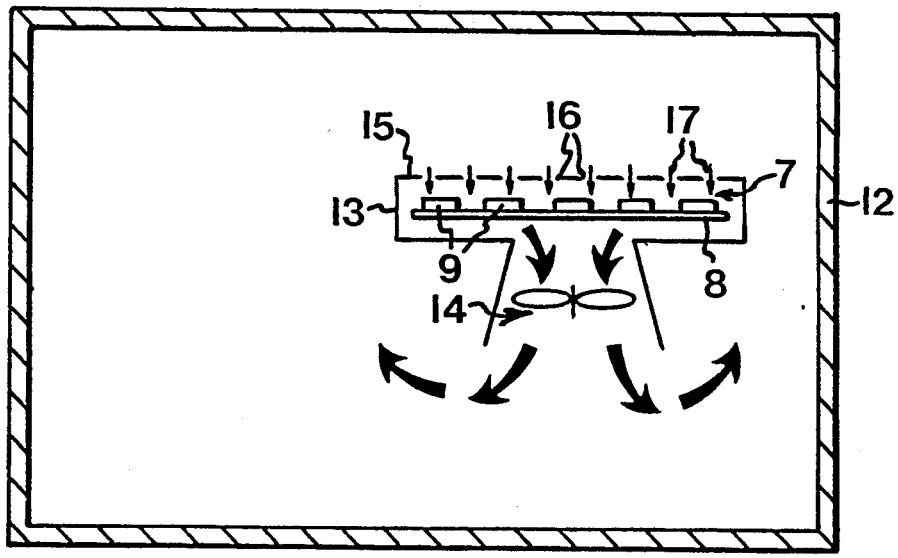
FIG._2a
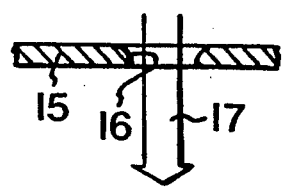

FIG._3
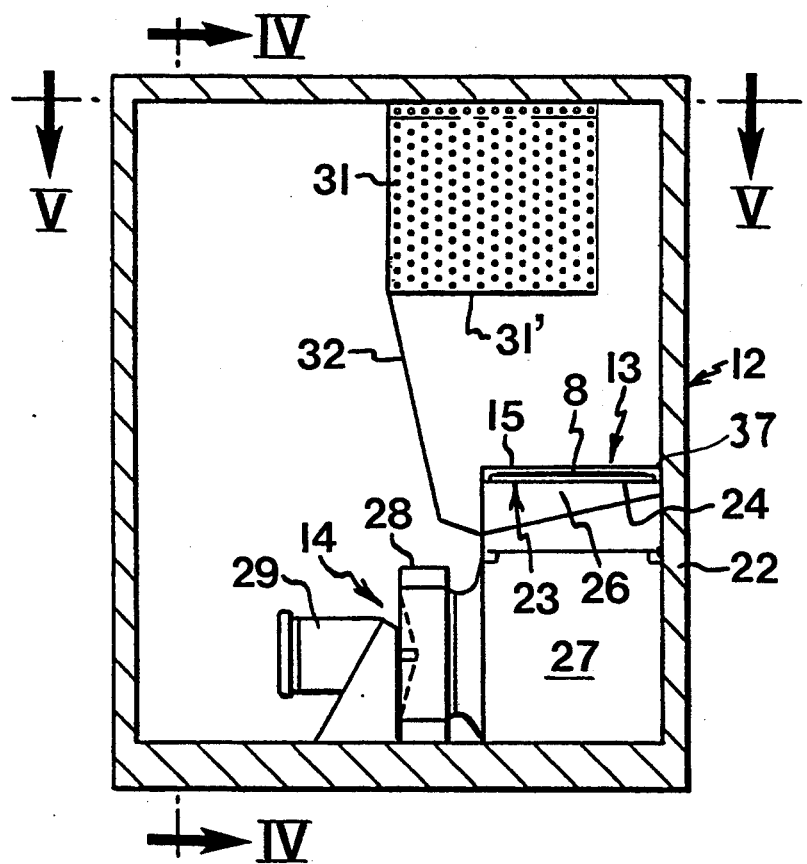
FIG._7
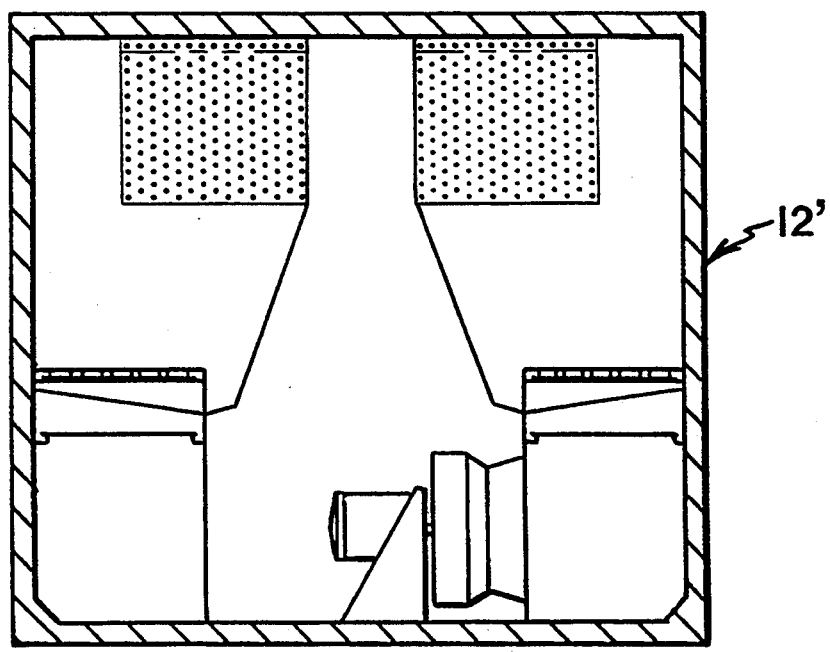

FIG_6
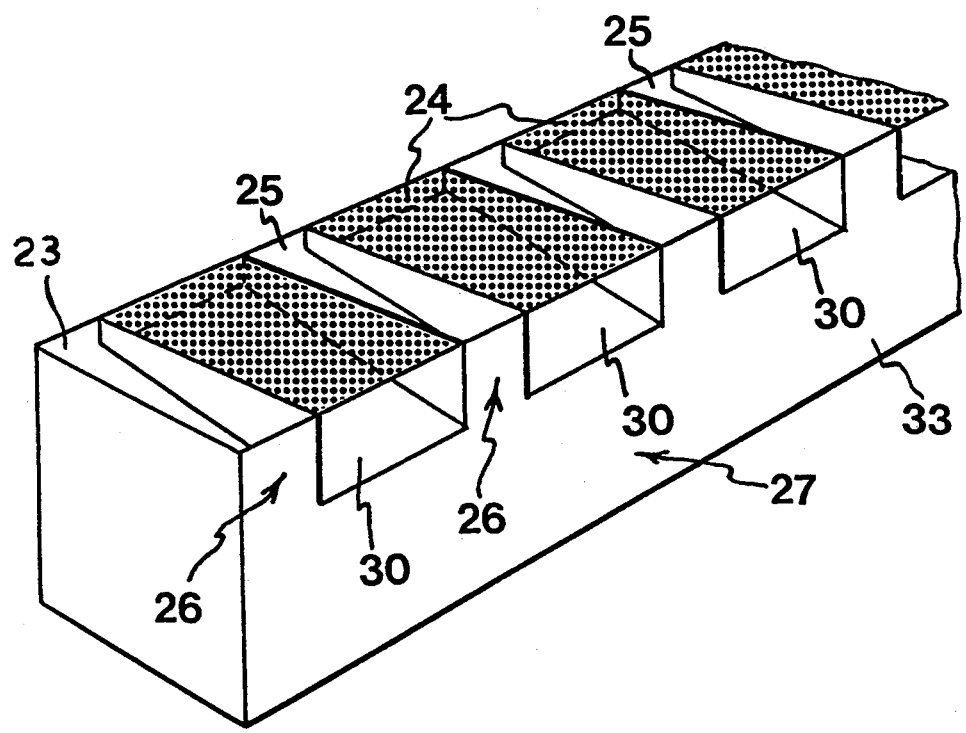

APPARATUS FOR GAS TREATMENT OF PRODUCTS

BACKGROUND OF THE INVENTION

The present invention is related to gas treatment of products, specifically food and similar products, using gas jets which impinge upon the products for e.g. cooling, heating or drying them.

Devices for cooling or heating food products are known from e.g. U.S. Pat. No. 4,679,542 to Donald P. Smith et al. These devices comprise a high-pressure gas plenum which communicates with upper and lower ducts defining a treatment area therebetween and having a plurality of nozzles for ejecting gas jets vertically into the treatment area. The food products to be treated are supported by a conveyor belt that transports them through the treatment area.

However, the control of the flow of gas in the prior art devices presents specific problems. Further, the design of those devices is quite complex, resulting in difficulties in meeting the high hygienic requirements of the food industry. Also, the maintenance of the prior art devices is time-consuming, and the intervals between successive shutdowns are short.

SUMMARY OF THE INVENTION

Therefore, one object of the present invention is to provide an apparatus for gas treatment of products which has a simple design.

Another object of the present invention is to provide such an apparatus which meets the high hygienic requirements of the food industry.

A further object of the present invention is to provide such an apparatus which facilitates maintenance.

Yet another object of the present invention is to provide such an apparatus which enables good control of the flow of gas, such that high efficiency, e.g. of heat transfer, is obtained.

According to the present invention, an apparatus for gas treatment of products comprises a housing having an inlet opening and an outlet opening; a conveyor belt for transporting the products through the apparatus along a path from the inlet opening to the outlet opening; a tunnel enclosing the conveyor belt at least along a part of the path from the inlet opening to the outlet opening, said tunnel having a top wall, two side walls and a bottom wall, at least one of the top and bottom walls being perforated; gas suction means communicating with the tunnel for creating a vacuum in the interior of the tunnel, the gas being circulated from the interior of the tunnel to the exterior thereof and back to the interior of the tunnel through said at least one perforated wall of the tunnel, such that gas sucked through said at least one perforated wall of the tunnel from the exterior thereof forms gas jets impinging upon the conveyor belt; and gas conditioning means for conditioning the gas circulated by the gas suction means.

By enclosing the treatment zone in a tunnel and connecting the tunnel to the gas suction means, the ducts of the prior art for distributing the gas to the treatment zone are eliminated, which improves the control of the gas flow. Further, the perforated wall of the tunnel is directly accessible for inspection and cleaning. Also, the perforations of said wall preferably extend over its whole area.

Preferably, the conveyor belt is foraminous, and the tunnel further has perforated top and bottom walls. Consequently, the gas will also be sucked through both perforated walls from the exterior of the tunnel, forming gas jets which impinge upon the conveyor belt. Thus, food products supported by the foraminous conveyor belt will be hit on the top and bottom surfaces by gas jets sweeping away the boundary gas layer close to these surfaces. In this manner, heat will be transferred between the gas and the food products at a high rate.

In a preferred embodiment, the top wall of the tunnel is perforated over substantially its whole area, while the bottom wall of the tunnel has perforated sections extending transversely of the path from the inlet opening to the outlet opening.

The apparatus may comprise a vacuum chamber to which said gas suction means is connected, a plurality of apertures in said other of the top and bottom walls of the tunnel, said apertures alternating with said perforated sections, and a corresponding plurality of ducts, each duct connecting one of said apertures with the vacuum chamber. Consequently, the vacuum created by the gas suction means will prevail throughout the vacuum chamber, the ducts connecting the vacuum chamber to the tunnel, and the tunnel. In this context, by vacuum is understood a pressure of about 1000–2000 Pascals below the ambient pressure.

Further, each perforated section may be connected to the exterior of the tunnel via a separate channel. As a result, each such channel may be defined by two of said ducts, said vacuum chamber and one of said perforated sections.

In the preferred embodiment, each channel has a closed end and an open end, and has a height increasing from said closed end toward said open end.

Preferably, the top wall of the tunnel is articulated at an edge thereof parallel to the path between the inlet opening and the outlet opening. Thus, by tilting the top wall of the tunnel from its operating position to a raised position, the interior of the tunnel will be accessible for inspection and cleaning.

Normally, the gas is air but may consist of other gases as well. Where the apparatus is used for freezing food products, the conditioning means consists of a cooling battery, such as an evaporator. When the apparatus is used for heating food products, the conditioning means may consist of a heat exchanger or an electrical heater. Finally, where the apparatus is used for drying food products, the conditioning means may consist of a moisture regulating device. Other conditioning means are a gas burner and a steam generator.

BRIEF DESCRIPTION OF THE DRAWINGS

FIG. 1 is a schematic sectional view of a prior art apparatus illustrating the operating principle thereof.

FIG. 2 is a similar schematic sectional view of an apparatus according to the present invention, and FIG. 2a shows a detail in FIG. 2.

FIG. 3 is a sectional view along line III—III in FIG. 5 of a preferred embodiment of an apparatus according to the present invention.

FIG. 6 is a perspective view showing a detail of a vacuum chamber of the apparatus according to FIGS. 3-5.

FIG. 7 is a view similar to FIG. 3 of an other embodiment of an apparatus according to the present invention.

DESCRIPTION OF THE PREFERRED EMBODIMENT

Figure 4:
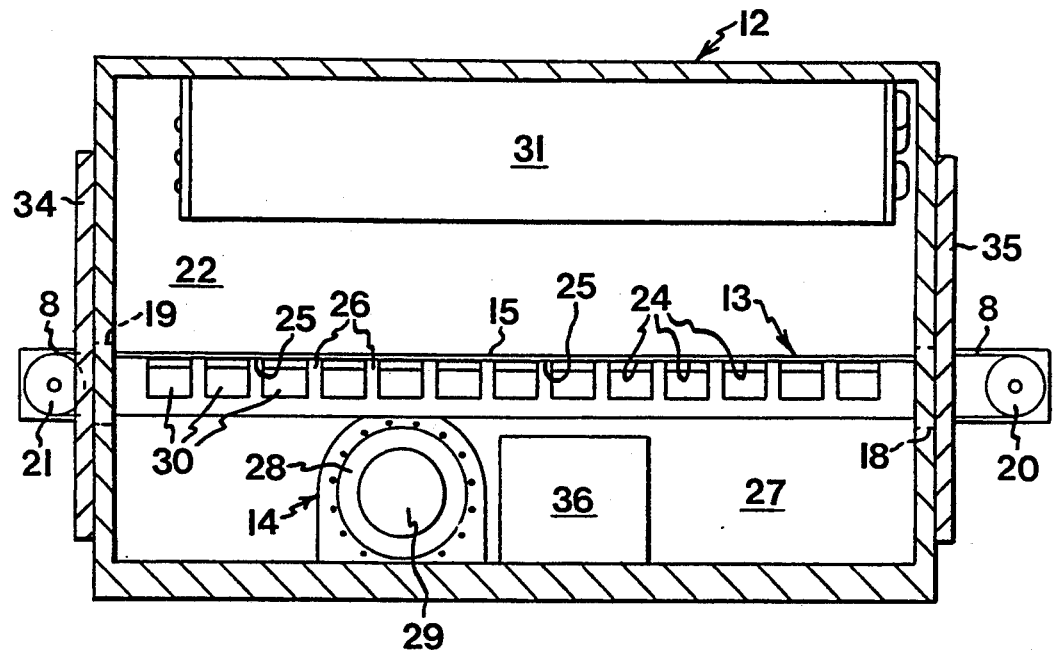
FIG. 4 is a longitudinal sectional view along line IV—IV in FIG. 3.

Referring now to FIG. 1, an air treatment device 10 according to the prior art comprises an enclosure 1 and a plenum 2 communicating with ducts 3, 4. The plenum 2 has an opening 5 in which an impeller 6 is mounted. In a treatment zone 7 between the ducts 3, 4, only two of which are shown, a conveyor belt 8 supports food products 9 to be treated.

The impeller 6 creates a high pressure in the plenum 2 and the ducts 3, 4, such that air jets 10 are ejected through nozzles 11 in the opposing sides of the ducts 3, 4. These air jets 10 impinge upon the top and bottom surfaces of the food products 9 supported by the conveyor belt 8, thereby sweeping away the boundary air layer closest to said top and bottom surfaces. As a consequence, the rate of the heat transfer between the air jets 10 and the food products 9 will be high. The air of the air jets 10 is circulated between the ducts 3, 4 back to the impeller 6 for maintaining a high pressure within the plenum 2 and the ducts 3, 4.

An air treatment device as described above is especially well adapted for the treatment of flat food products, such as meat patties, since the air jets have a limited effective range. Consequently, the treatment zone 7 will have a limited height which makes this zone 7 difficult of access for inspection and cleaning. Also, the design of the ducts 3, 4 impairs the possibility of inspecting and cleaning the interior of these ducts 3, 4.

As illustrated in FIG. 2, the apparatus according to the present invention comprises a housing 12, in which a tunnel 13 encloses the treatment zone 7. The tunnel 13 communicates with an air suction means 14, e.g. a fan, and a conveyor belt 8 supports the food products 9 in the tunnel 13. In FIG. 2, only a top wall 15 of the tunnel 13 is perforated, forming nozzles 16 (cf. FIG. 2a) without any parts extending above or below the wall 15. Thus, the sides of the wall 15 are perfectly smooth which is advantageous with regard to the hygienic requirements. Also, the rounded edges at the inlet end of the perforations reduce losses in the gas flow, and thereby well defined air jets are formed. In the preferred embodiment described below, the bottom wall of the tunnel 13 is also perforated.

In operation, the air suction means 14 creates a vacuum in the interior of the tunnel 13, such that air is sucked through the nozzles 16 in the top wall 15, thereby forming air jets 17 impinging upon the conveyor belt 8 and the food products 9 placed thereon.

It is seen that the design of the apparatus in FIG. 2 is more simple than that of the apparatus in FIG. 1. Thus, the perforated wall 15 is directly accessible for inspection and cleaning. Further, by making the top wall 15 articulated, the conveyor belt 8 and the interior of the tunnel 13 will be accessible for inspection and cleaning.

It should also be noted that the pressure in the housing 12 is equal to the ambient pressure. When starting the apparatus in FIG. 2 however, the suction means 14 will create a slightly higher pressure in the housing 12, whereby air will leak from inside the housing 12 to the outside thereof. The opposite is true for the device in FIG. 1, where bacteria might be sucked into the enclosure 1 of that device when it is started, which will shorten the operating runs of the device.

A preferred embodiment of the apparatus according to the present invention will be described below referring to FIGS. 3–6.

As illustrated in FIG. 4, the housing 12 has an inlet opening 18 and an outlet opening 19 for food products to be treated in the apparatus. The conveyor belt 8 extends between rollers 20, 21 in an upper path for transporting the food products from the inlet opening 18 to the outlet opening 19, and follows a lower return path from the outlet opening 19 to the inlet opening 18. The tunnel 13 encloses the conveyor belt 8 along a part of its upper path between the inlet opening 18 and the outlet opening 19. The tunnel 13 has a perforated top wall 15 in the form of a separate plate having an articulation 37 which is articulated at its side edge close to a wall 22 of the housing 12 shown in FIG. 3. The tunnel 13 further has a perforated bottom wall 23 which is divided into perforated sections 24 alternating with apertures 25 along the upper path of the conveyor belt 8 (FIG. 6). The perforated sections 24 and the apertures 25 extend transversely of the path between the inlet opening 18 and the outlet opening 19 over the whole width of the conveyor belt 8. Via ducts 26, each aperture 25 is connected to a vacuum chamber 27 positioned under the tunnel 13 and extending along the length thereof.

The suction means 14, including a fan 28 and a motor 29, is connected to the vacuum chamber 27 and, via the ducts 26, to the tunnel 13. Channels 30 positioned between the ducts 26 lead from the exterior of the tunnel 13 and the vacuum chamber 27 to each perforated section 24. Thus, each channel 30 is defined by the walls of two adjoining ducts 26 and a top wall of the vacuum chamber 27. Each channel 30 further has a closed end defined by the wall 22 of the housing 12, and an open end. The height of each channel 30 preferably increases from the closed end to the open end thereof.

Alternatively, rather than top wall 15 being fully perforated atop wall 15' can have perforated sections 24' and apertures 25' with channels 30' separated by ducts 26'. Further, top wall 15' can be articulated with articulation 37 as is top wall 15.

A heat exchanger or evaporator 31 is mounted in the ceiling of the housing 12 above the tunnel 13. A buffer plate 32 connects a bottom plate 31' of the heat exchanger 31 to a front wall 33 of the vacuum chamber 27, such that the air sucked out from the vacuum chamber 27 by the suction means 14 is circulated through the heat exchanger 31 and through the nozzles 16 in the top wall 15 of the tunnel 13 and in the bottom wall sections 24 back to the interior of the tunnel 13.

The air forming air jets when sucked through the nozzles 16 in the top wall 15 and the bottom wall sections 24 of the tunnel 13, will impinge upon the top and bottom surfaces of the food products 9 supported by the conveyor belt 8, whereafter the air will pass into the ducts 26 through the apertures 25 and into the vacuum chamber 27.

Figure 5:
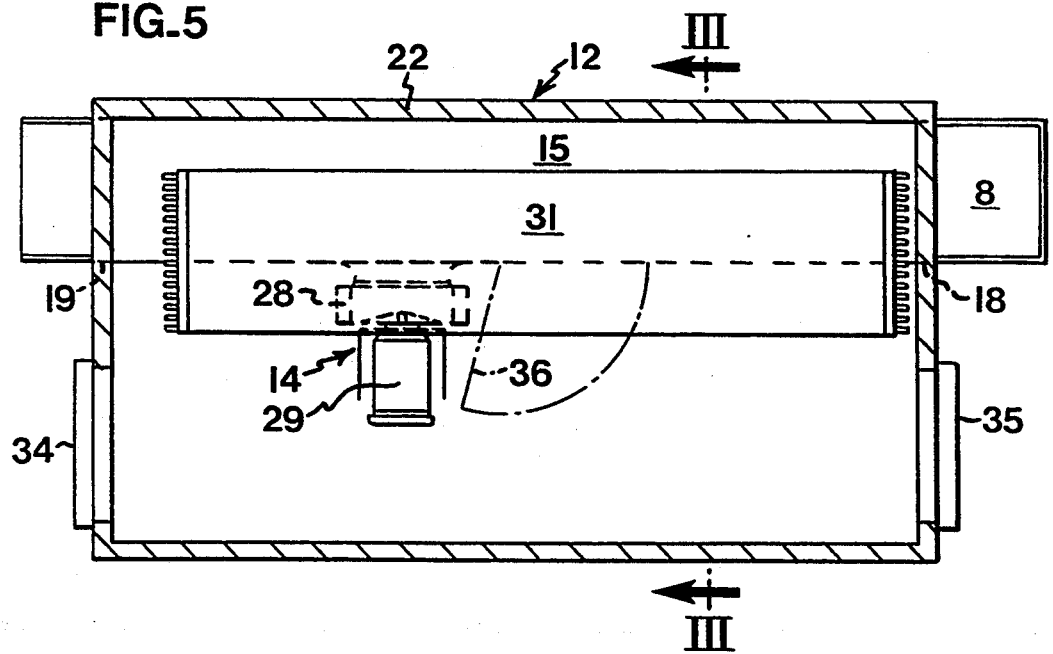
FIG. 5 is a sectional view from above along line V—V in FIG. 3.
Figure 8:
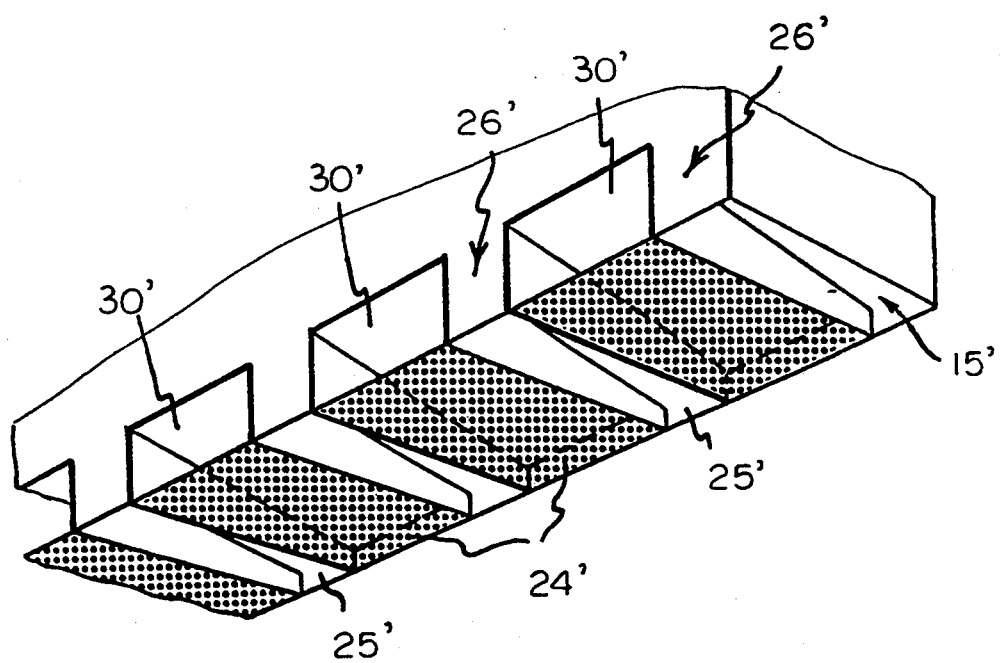
FIG. 8 is a perspective view showing an alternative detail of the vacuum chamber of the apparatus according to the invention.

As shown in FIGS. 4 and 5, the housing 12 and the vacuum chamber 27 have doors 34-36 to provide access to the interior of the housing 12 and the vacuum chamber 27.

In order to adapt the apparatus to food products of different heights, the top plate 15 of the tunnel 13 may be vertically adjustable.

As shown in FIG. 7, two apparatuses as described above may be contained in one and the same housing 12'. Larger apparatuses may be designed by combining such modules as exemplified in FIGS. 2–6 and 7, respectively.

It is to be understood that modifications, alterations and changes can be made in the apparatus without departing from the scope of the invention as claimed herein. As an example, the top wall 15 of the tunnel 13 could be exchanged for another top wall having different perforations.

What is claimed is:

1. An apparatus for gas treatment of products, comprising:

a housing having an inlet opening and an outlet opening;

a foraminous conveyor belt for transporting the products through the housing along a path from the inlet opening to the outlet opening;

a tunnel enclosing the conveyor belt at least along a part of the path from the inlet opening to the outlet opening, said tunnel having a top wall, two side walls and a bottom wall, one of the top wall and the bottom wall being perforated substantially over the whole area thereof and the other of the top wall and the bottom wall having perforated sections extending transversely of the path from the inlet opening to the outlet opening and a plurality of apertures alternating with said perforated sections;

a vacuum chamber;

a plurality of ducts, each duct connecting one of said apertures with the vacuum chamber;

gas suction means communicating with the vacuum chamber for creating a vacuum therein, the gas being circulated from the interior of the tunnel to the exterior thereof and back to the interior of the tunnel through said perforated wall and said perforated sections, such that gas sucked through said perforated wall and said perforated sections from the exterior thereof forms gas jets impinging upon the conveyor belt; and gas conditioning means for conditioning the gas circulated by the gas suction means.

2. An apparatus as claimed in claim 1, wherein said housing has doors providing access to an interior of the housing and to said vacuum chamber.

3. An apparatus as claimed in claim 2, wherein said wall perforated substantially over the whole area thereof is directly accessible from the exterior of the tunnel.

4. An apparatus as claimed in claim 1, wherein each perforated section is connected to the exterior of the tunnel via a separate channel.

5. An apparatus as claimed in claim 4, wherein each channel is defined by two of said ducts, a wall of said vacuum chamber and one of said perforated sections.

6. An apparatus as claimed in claim 5, wherein each channel has a closed end and an open end, and has a height increasing from said closed end toward said open end.

7. An apparatus as claimed in claim 1, wherein said top wall being perforated substantially over the whole area thereof is articulated at an edge thereof parallel to the path between the inlet opening and the outlet opening.

8. An apparatus as claimed in claim 1, wherein the distance between the conveyor belt and at least one of the top and bottom walls of the tunnel is adjustable.

9. An apparatus as claimed in claim 1, wherein the gas is air.

10. An apparatus as claimed in claim 1, wherein the conditioning means is a heat exchanger.

11. An apparatus as claimed in claim 10, wherein the conditioning means is an evaporator.

12. An apparatus as claimed in claim 1, wherein the height of the tunnel is substantially equal to the sum of the height of the conveyor belt and the height of the products.

* * * * *